US005249811A

United States Patent [19]

Brückner et al.

[11] Patent Number: 5,249,811

[45] Date of Patent: Oct. 5, 1993

[54] REFRACTORY JOINT PACKING FOR AN ANNULAR GAP IN A METALLURGICAL VESSEL

[75] Inventors: Raimund Brückner, Engenhahn-Niedernhausen; Hans Rothfuss, Taunusstein; Manfred Berndt, Krefeld, all of Fed. Rep. of Germany

[73] Assignee: Didier-Werke AG, Wiesbaden, Fed. Rep. of Germany

[21] Appl. No.: 744,378

[22] Filed: Aug. 13, 1991

[30] Foreign Application Priority Data

Aug. 16, 1990 [DE] Fed. Rep. of Germany ....... 4025956

[51] Int. Cl.$^5$ ........................ F16J 15/10; F16J 15/14; C21C 5/48

[52] U.S. Cl. .......................................... 277/1; 277/26; 277/226; 277/229; 277/DIG. 10; 266/271; 266/272

[58] Field of Search ................. 277/26, DIG. 10, 236, 277/190, 198, 117, 229, 226, 1; 266/271, 272, 273, 217, 218, 220, 266

[56] References Cited

U.S. PATENT DOCUMENTS

| | | | |
|---|---|---|---|
| 3,007,600 | 11/1961 | Horner | 277/26 |
| 3,869,132 | 3/1975 | Taylor et al. | 277/26 |
| 4,077,389 | 5/1978 | Vogel | 277/26 X |
| 4,172,598 | 10/1979 | Thomas | 277/229 X |
| 4,194,036 | 3/1980 | Davis et al. | |
| 4,392,636 | 7/1983 | Clumpner | 266/218 |
| 4,407,969 | 10/1983 | Widener et al. | |
| 4,462,576 | 7/1984 | Hohberg et al. | |
| 4,471,950 | 9/1984 | LaBate | 266/271 X |
| 4,494,735 | 1/1985 | Hershey | 266/218 |
| 4,509,977 | 4/1985 | Gerber | |
| 4,538,795 | 9/1985 | La Bate | |
| 4,602,768 | 7/1986 | Tinnes et al. | 266/236 X |
| 4,768,267 | 9/1988 | Burbach et al. | 266/220 X |
| 4,911,414 | 3/1990 | Bates et al. | 266/218 X |
| 4,978,108 | 12/1990 | Rothfuss et al. | 266/265 X |
| 5,014,917 | 5/1991 | Sirocky et al. | 277/226 X |

FOREIGN PATENT DOCUMENTS

| | | | |
|---|---|---|---|
| 2102059 | 8/1972 | Fed. Rep. of Germany | |
| 3105531 | 9/1982 | Fed. Rep. of Germany | |
| 3201531 | 7/1983 | Fed. Rep. of Germany | |
| 571815 | 3/1924 | France | |
| 2044723 | 2/1971 | France | |
| 2519971 | 7/1983 | France | |
| 0019053 | 1/1984 | Japan | 266/217 |
| 1381341 | 1/1975 | United Kingdom | |
| 1381342 | 1/1975 | United Kingdom | |
| 2150868 | 7/1985 | United Kingdom | 266/220 |

OTHER PUBLICATIONS

Derwent Abstract (Japan), 35379 D/20, Aug. 1979.

Derwent Abstract (Soviet Union), 89633 C/50, Sep. 1978.

*Primary Examiner*—William A. Cuchlinski, Jr.
*Assistant Examiner*—James K. Folker
*Attorney, Agent, or Firm*—Wenderoth, Lind & Ponack

[57] ABSTRACT

An annular space is formed between the opening of a refractory lining in a metallurgical vessel and a shaped element to be joined to the refractory lining in the opening. A joint packing is provided to be packed in the annular space. The joint packing is an annular, deformable, prefabricated packing adapted to the volume or the shape of the annular space. The joint packing is fixable in position in either the opening of the refractory lining or on the shaped piece when the joint arrangement is assembled. Preferably, the joint packing comprises a packing compound provided in a sleeve.

13 Claims, 2 Drawing Sheets

REFRACTORY JOINT PACKING FOR AN ANNULAR GAP IN A METALLURGICAL VESSEL

BACKGROUND OF THE INVENTION (1) Field of the Invention

The present invention relates to a refractory joint packing for an annular gap or space formed between a shaped piece, in particular, a gas flushing stone, and the opening of a refractory lining of a metallurgical vessel in which the gas flushing stone is to be installed.

(2) State of the Prior Art

As is known, the annular space formed between a refractory lining of a metallurgical vessel and a gas flushing stone that is installed in the lining is usually grouted to guarantee the necessary tight fit of the gas flushing stone in the lining. This is particularly necessary when the refractory lining is perforated brick receiving the gas flushing stone. The procedure of grouting is a time consuming manual operation. It must be carried out under conditions which are difficult, due to the limited amount of space available and the surrounding heat. Nonetheless, the annular space must be uniformly sealed with certainty, because otherwise leaks will occur in service, which can result in the melt in the metallurgical vessel from escaping therefrom.

In DE 32 01 531 A1 a joint layer for refractory brick in a cement rotary kiln is disclosed. The joint layer is made of a ceramic fiber mat.

In DE 31 05 531 C2 there is a disclosed a process for manufacturing refractory fibrous pulps, along with their application as expansion joint filler material. Such expansion joints are provided especially for the linings of rotary kilns, but have not been used for gas flushing stones of metallurgical vessels.

In DE-OS 21 02 059 there is disclosed a slide gate nozzle for a metallurgical vessel. In this publication the bottom brick of the vessel has a refractory sleeve mortared therein. There is no gas flushing stone illustrated for the metallurgical vessel. The slide gate has a depending nozzle which employs a conical sleeve made of refractory ceramic fibers drawn over the component.

SUMMARY OF THE INVENTION

The object of the present invention is to provide a refractory joint packing which enables the mounting of a shaped piece into the refractory lining of a metallurgical vessel in a simple manner while ensuring the required seal between the shaped piece and the refractory lining.

The above object of the present invention is accomplished according to the invention by the provision of a joint packing for use in packing the annular space formed between an opening of a refractory lining of a metallurgical vessel and a shaped element to be joined to the refractory lining. The joint packing comprises an annular, deformable prefabricated packing that is adapted to either the volume or the shape of the annular space into which it is to be packed, and is fixable in position in either the opening of the refractory lining or on the shaped piece.

More specifically, the present invention provides a joint arrangement in a metallurgical vessel wherein a refractory lining in the metallurgical vessel has an opening therein. A shaped element is provided to be joined to the refractory lining in the opening, with the shaped element and the refractory lining forming an annular space therebetween, and a joint packing is provided to be packed in the annular space. The joint packing is an annular, deformable, prefabricated packing that is adapted to either the volume or the shape of the annular space and is fixable in position either in the opening of the refractory lining or on the shaped piece when the joint arrangement is assembled.

The annular space is conical, and thus the joint packing is preferably conically shaped to match the shape of the annular space.

In one preferred feature of the present invention, the joint packing comprises a sleeve which has a shape that corresponds to the annular space and a compound packed in the sleeve. The compound has the property of expanding when the temperature of the compound rises to the normal operating temperature of the metallurgical vessel. The packing preferably has an initial volume smaller than the volume of the annular space.

In a further preferred feature of the present invention, the packing comprises a sleeve which corresponds to either the volume or the shape of the annular space and has a plastically deformable compound packed therein. The sleeve has a volume greater than or equal to the volume of the annular space. The sleeve also preferably has a breaking point therein for tearing the sleeve. In a further preferred feature, the sleeve is made of an organic material, such as paper or plastic, or a metal foil.

In a further preferred feature of the present invention, the joint packing is made of a compressible ceramic fiber material which is in the shape of the annular space and has a volume greater than or equal to the volume of the annular space. The fiber material is preferably packed into a sleeve.

In a further preferred feature of the present invention, the shaped element is a gas flushing stone. The gas flushing stone and the joint packing can then form a prefabricated subassembly. The prefabricated subassembly comprising the gas flushing stone and the joint packing is then inserted into the opening of the refractory lining. In a further preferred feature, the prefabricated subassembly is packed into a common, combustible jacket.

The above-discussed problems with regard to the prior art in packing the space between a shaped piece and a refractory lining is solved by the present invention in that the joint packing is prefabricated and deformable, as well as being adapted to the shape or the volume of the annular space, and can be fixed in position on the shaped piece or in the opening in the refractory lining before the installation of the shaped piece. This thus makes mortaring operations upon insertion of a shaped piece into a refractory lining of a metallurgical vessel superfluous.

By having the prefabricated joint packing in the shape or the volume of the annular space guarantees that the annular space will be uniformly filled with the joint packing when the shaped piece is in its installed state. The deformability of the joint packing which still exists during or following the insertion of the shaped piece into the opening of the refractory lining guarantees that the annular space will be sealed about its circumference in the operating state.

Furthermore, since the joint packing can be deformed into the shape of the annular space, the joint arrangement can be readily assembled, in that the joint packing is fixed in position either on the shaped piece or in the opening before the installation of the shaped piece. In this manner, the packing process automatically proceeds by itself, shaping the packing into the desired position, and filling the annular space, by the installation of the shaped piece, without the requirement of any additional operations. In addition to providing a secure seal, the joint packing can serve to fasten or hold the shaped piece in the opening of the refractory lining.

If the gas flushing stone, and correspondingly the annular space in the refractory lining formed between the gas flushing stone and the refractory lining, is shaped in the form of a cone, then the joint packing is also preferably shaped to match the conical shape of the annular space before its installation therein.

According to one preferred feature of the present invention described above, the joint packing is made of a compound which expands at the operating temperature of the metallurgical vessel, and which is packed in a sleeve that is adjusted to the shape or the volume of the annular space. The volume of the joint packing is preferably less than that of the annular space, as indicated above. When the metallurgical vessel is heated, the joint packing will expand all the way around the annular space, resulting in the required seal. Raw materials having a high thermal expansion rate, such as MgO, are preferably used for these compounds, or alternatively raw materials whose reaction with one another will produce the adequate expansion, as is the case during spinel formation. However, in this embodiment the compound should not reduce again with changes in temperature.

According to another preferred feature of the present invention described above, the joint packing is made of a flexibly deformable compound which is packed in a sleeve that corresponds to either the shape or the volume of the annular space. The volume of the joint packing is equal to or greater than of the annular space. Thus, when the shaped piece is inserted into the opening of the refractory lining, the joint packing will assume a shape which completely fills the annular space. The allowable variations are balanced between the shape of the opening and the shaped piece. Similarly, the tolerances of the sleeve are compensated.

According to a further preferred feature of the present invention as discussed above, the joint packing is made of a compressible ceramic fiber material that is preshaped according to the shape of the annular space and has a volume equal to or greater than that of the annular space. A sleeve for the packing can be provided, but is not required. When the shaped piece is inserted into the opening of the refractory lining, the packing is compressed and thus completely fills the annular space. Preferably, the volume of the packing prior to installation is greater than that of the annular space.

Preferably, the sleeve of the packing is made to be flexible, such that when a shaped piece is inserted into the opening of the refractory lining, the sleeve will deform so as to adapt to the shape of the annular space. In so doing, the sleeve may also tear open.

According to a further preferred feature of the present invention, the sleeve is made of an organic material such as paper or plastic, or a metal foil. When the metallurgical vessel is then put in service, the sleeve will be burned or sintered so that the sleeve will not impair the desired seal of the annular space. In this case it should be noted that the joint packing can be removed quite readily from the perforated brick of the refractory lining after the gas flushing stone has worn down. This result is achieved by the fact the sleeve forms a separate layer, without having a negative impact on the strength of the connection between the gas flushing stone and the refractory lining during service.

And as also discussed above, the joint packing and the gas flushing stone can form a prefabricated subassembly that can be transported to the site of the metallurgical vessel and then be pushed into the opening thereof. This prefabricated subassembly, as noted, can also have a jacket into which the gas flushing stone and the packing are packed.

BRIEF DESCRIPTION OF THE DRAWINGS

Further features and advantages of the present invention will become apparent to those of skill in the art from the following detailed description taken in conjunction with the attached drawing figures, in which.

DETAILED DESCRIPTION OF THE PREFERRED EMBODIMENTS

Figure 1:
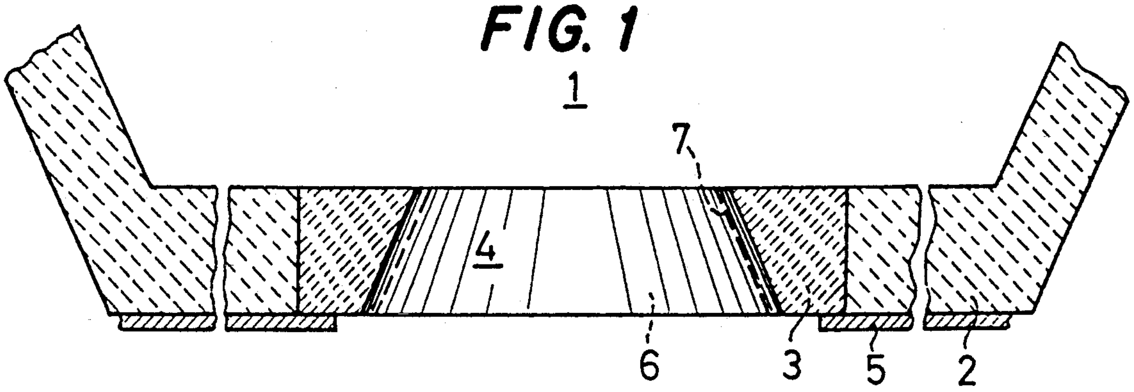
FIG. 1 is a sectional view of a metallurgical vessel at an opening of a refractory lining thereof.

Referring initially to FIG. 1, there is illustrated a metallurgical vessel having a refractory lining 2. The refractory lining 2 includes a perforated brick 3 inserted therein. The perforated brick 3 has a conical opening 4 for receipt of a gas flushing stone, and an outer shell 5 is mounted externally on the metallurgical vessel 1.

Figure 4:
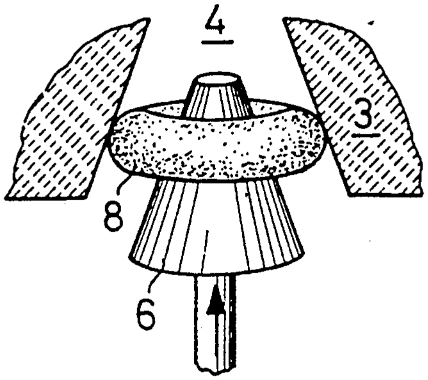
FIG. 4 is a partially sectional view corresponding to the view of FIG. 1 of a conical gas flushing stone being placed in the opening of the metallurgical vessel with the joint packing thereon, the joint packing having its volume adapted to the volume of the annular space formed between the gas flushing stone and the refractory lining.
Figure 5:
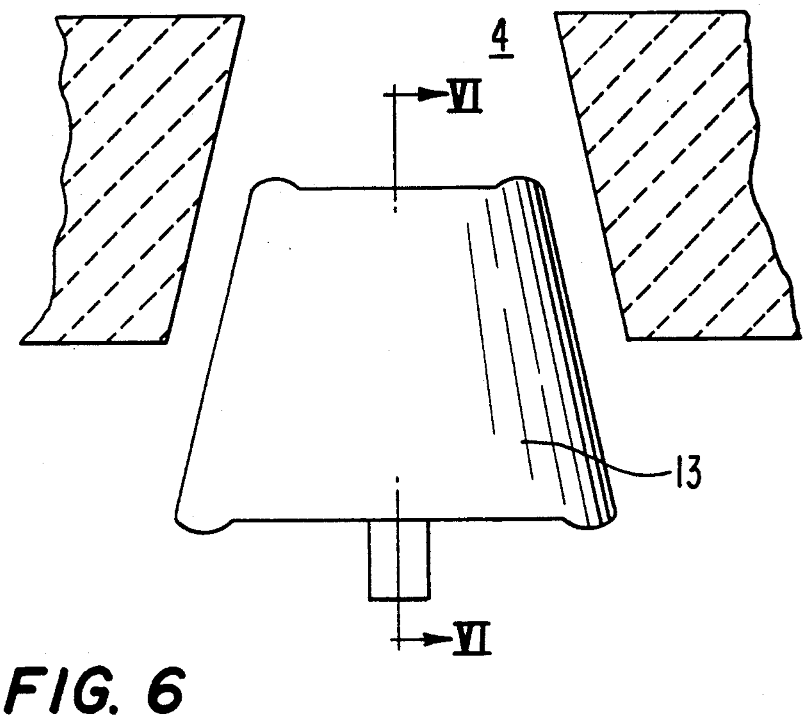
FIG. 5 is a partially sectional view, corresponding to FIG. 4, with the gas flushing stone having a jacket.
Figure 6:
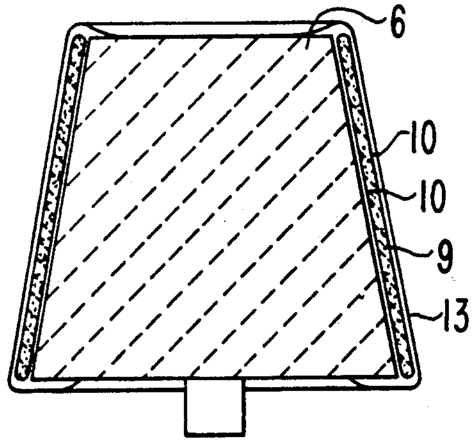
FIG. 6 is a sectional view along line VI—VI of FIG. 5.

As noted above, the opening 4 is provided for the insertion of, as illustrated in FIG. 1, a cone shaped gas flushing stone 6. The flushing stone 6 is illustrated in FIG. 4 and represented by a dashed line in FIG. 1. When the gas flushing stone 6 is inserted into the opening 4 of the refractory lining of the metallurgical vessel, a conical annular space 7 is formed therebetween, which space must be filled by a joint packing.

A joint packing 8 is provided for filling the annular space 7. The joint packing is preferably prefabricated in the shape of the annular space 7. In its prefabricated state, the joint packing 8 does not have exactly the shape of the annular space 7, but rather is designed so that it will adapt to the shape of the annular space 7 which results when the gas flushing stone 6 is installed in the opening 4. The joint packing, in FIG. 2 preshaped in the shape of the conical annular space, is made of a compound 9 which withstands the temperature generated during the operation of the metallurgical vessel 1.

Figure 2:
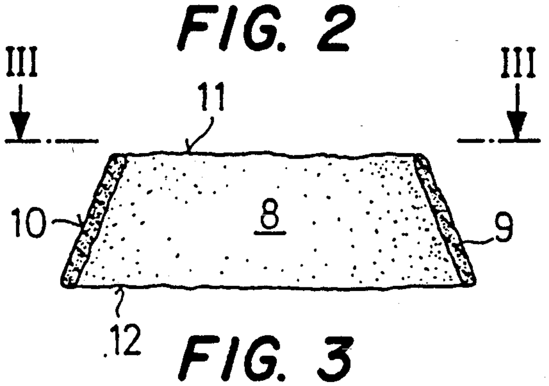
FIG. 2 is a sectional view of a prefabricated, deformable joint packing for the opening of FIG. 1.
Figure 3:
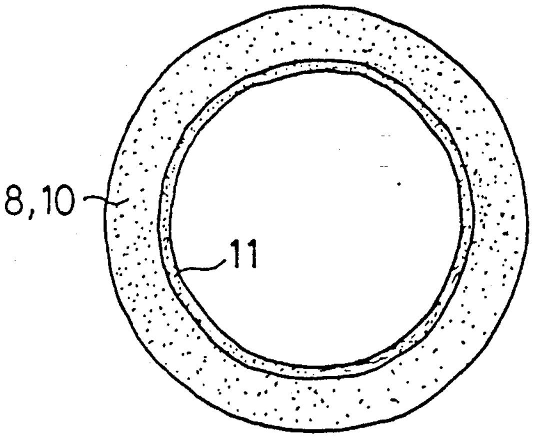
FIG. 3 is a top view of the joint packing of FIG. 2 taken along line III—III.

Preferably, the compound 9 of the joint packing 8 is enclosed in a sleeve 10 when the compound 9 is not adequately stable either in terms of maintaining its shape or volume before the installation thereof in the opening 4. The sleeve 10 may be made of, for example, paper, a plastic film or a metal foil. In any event, the sleeve 10 will be shaped in such a manner that it will not prevent the annular space 7 from being totally filled with the compound 9 when the gas flushing stone is pushed into the opening 4. As an optional feature, the sleeve 10 can be provided with suitable breaking points thereon to facilitate the breaking of the sleeve 10 upon insertion to allow the compound 9 to adequately fill the annular space when the gas flushing stone is pushed into the opening 4. In particular, ideal breaking points take the form of tear lines 11 or 12 on the upper and lower face edges of the conically shaped sleeve as illustrated in FIGS. 2 and 3.

The installation of the gas flushing stone together with the joint packing can take place as follows. The joint packing 8 is initially mounted on the gas flushing stone 6. This can take place immediately after the manufacture of the gas flushing stone 6, before the stone is brought to the metallurgical vessel 1. The gas flushing stone 6 and the joint packing 8 thus form a prefabricated subassembly. The prefabricated subassembly can, preferably, be enveloped by a jacket made of paper or plastic film or metal foil. The ga flushing stone 6 having the joint packing 8 thereon is then pushed into position at the point of installation at the opening 4. As a result, the joint packing 8 completely fills the resulting annular space 7. Packing alternatively, the joint packing 8 may be first inserted into the opening 4, and fixed in position therein, and then thereafter the gas flushing stone 6 may be inserted into the opening 4.

The compound 9 of the joint packing 8 can be made of a compound which swells when the lining 2 is heated after the gas flushing stone 6 has been inserted into the opening 4 so that the compound will completely fill the annular space 7 by swelling.

The compound 9 can also be chosen such that the compound will be flexibly deformable at least when the gas flushing stone is inserted into the opening 4 so that it will properly deform and fill the annular space 7.

The joint packing 8 could also be made of a compressible ceramic fiber material. Thus, when pushing the gas flushing stone 6 into the opening 4 of the perforated brick 3, the compressible ceramic fiber material would compress to ensure the complete filling of the annular space 7.

A first example of a suitable compound 9 for the joint packing 8 comprises:

| | | |
|---|---|---|
| a) $Al_2O_3$ (alumina) | 0.1-0.3 mm | 70 wt. % |
| b) $Al_2O_3$ (reactive/calcined alumina) | <0.1 mm | 25 wt. % |
| c) $MgCO_3$ (magnesium carbonate) and also as binder | <1 mm | 5 wt. % |
| d) polyphosphate solution (70%) | | 23 wt. % |

The result of the above composition is a swelling action, first due to the formation of $CO_2$ from $MgCO_3$ according to $MgCO_3 \rightarrow MgO + CO_2$ at about 300° C., and secondly due to the formation of spinel at temperatures > 1,000° C., according to $MgO + Al_2O_3 \rightarrow MgAl_2O_4$.

Instead of the polyphosphate solution, a slurry of 3 wt. % kaolin and/or 2 wt. % bentonite in 25 wt. % water can also be added as the binder.

A second example of a suitable compound 9 for the joint packing 8 comprises:

| | | |
|---|---|---|
| a) $Al_2O_3$ (alumina) | 0.1-0.3 mm | 63 wt. % |

-continued

| | | |
|---|---|---|
| b) $Al_2O_3$ (reactive/calcined alumina) | <0.1 mm | 24 wt. % |
| c) $MgCO_3$ (magnesium carbonate) | <0.1 mm | 8 wt. % |
| d) Kaolin | | 5 wt. % |

and then also as a binder 24 wt. % of an aqueous 0.2% solution of a modified corn starch.

Especially for use with melts of nonferrous metals, blends with fibers and vermiculite are suitable, for example:

| | (a) | (b) | (c) |
|---|---|---|---|
| ceramic fibers (kg) | 4 | 4 | 4 |
| polyethylene fibrides (kg) | 4.1 | 2.5 | 2.5 |
| polyacrylate dispersion (g) | 300 | 300 | 300 |
| unbleached vermiculite, screened 80% < 0.5 mm (kg) | 1.5 | 6 | 2 |
| unbleached vermiculite ground 90% < 0.5 mm (kg) | — | — | 2 |
| swelling pressure ($N/mm^2$) | 0.2 | 0.8 | 0.6 |

Although the present invention has been described and illustrated with respect to preferred features thereof, it is to be understood that various modifications and changes may be made to the specifically described and illustrated features without departing from the scope of the present invention.

We claim:

1. A joint arrangement in a metallurgical vessel, comprising:
   - a refractory lining in said metallurgical vessel having an opening therein;
   - a shaped element to be joined to said refractory lining in said opening thereof, said shaped element and said refractory lining forming an annular space therebetween; and
   - a joint packing to be packed in said annular space, said joint packing comprising an annular, deformable, prefabricated packing adapted to said annular space and fixable in position with one of said opening of said refractory lining and said shaped piece when said joint arrangement is assembled, said joint packing comprising a packing material and means for forming a separate layer between said packing material and said opening of said refractory lining during use of said shaped element in said metallurgical vessel such that said packing material can be removed from said refractory lining after use of said shaped element, said means comprising a sleeve adapted to said annular space, and said packing material being packed in said sleeve.

2. The joint arrangement of claim 1, wherein said annular space is conical and said joint packing is conical in shape to match the shape of said annular space.

3. The joint arrangement of claim 1, wherein said packing material comprises a compound having the property expanding when the temperature of said compound rises to the normal operating temperature of said metallurgical vessel, and said joint packing having an initial volume smaller than the volume of said annular space.

4. The joint arrangement of claim 1, wherein said packing material comprises a plastically deformable compound packed in said sleeve, said compound having a volume greater than or equal to the volume of said annular space.

5. The joint arrangement of claim 4, wherein said sleeve comprises a breaking point for tearing said sleeve.

6. The joint arrangement of claim 4, wherein said sleeve is made of one of an organic material and a metal foil.

7. The arrangement of claim 1, wherein said packing material is a compressible ceramic fiber material in the shape of said annular space and has a volume greater than or equal to the volume of said annular space.

8. The joint arrangement of claim 1, wherein:

said shaped element is a gas flushing stone; and a prefabricated subassembly including said gas flushing stone and said joint packing mounted thereon for insertion into said opening of said refractory lining.

9. The joint arrangement of claim 8, wherein said prefabricated subassembly is packed into a combustible jacket.

10. The joint arrangement of claim 1, wherein said sleeve is made of metal foil.

11. A method of joining a shaped element to an opening in a refractory lining of a metallurgical vessel, the shaped element and the refractory lining about the opening forming an annular space therebetween, said method comprising:

providing a joint packing to be packed into the annular space, the joint packing comprising an annular, deformable, prefabricated packing adapted to the annular space, and the joint packing including a sleeve adapted to the annular space and a packing material packed in said sleeve;

fixing the joint packing in position with one of the opening of the refractory lining and the shaped element;

assembling the shaped element with the opening of the refractory lining;

forming a separate layer between the packing material and the opening of the refractor lining during use of the shaped element in the metallurgical vessel; and removing the packing material from the refractory lining after use of the shaped element.

12. The method of claim 11, wherein the packing material has an initial volume smaller than the volume of the annular space, but expands when the temperature of the packing material rises to the normal operating temperature of the metallurgical vessel.

13. The method of claim 11, wherein the sleeve has a breaking point thereon and tears when the shaped element is assembled with the refractory lining.

* * * * *